United States Patent Office 3,345,355
Patented Oct. 3, 1967

3,345,355
2-METHYLENE INDOLINE AZOMETHINE GROUP-CONTAINING BASIC DYESTUFFS
Roderich Raue, Leverkusen, Germany, assignor to Farbenfabriken Bayer Aktiengesellschaft, Leverkusen, Germany, a corporation of Germany
No Drawing. Continuation of application Ser. No. 144,572, Oct. 12, 1961, which is a continuation of application Ser. No. 754,525, Aug. 12, 1958. This application Apr. 13, 1966, Ser. No. 542,210
Claims priority, application Germany, Aug. 30, 1957, F 23,877
15 Claims. (Cl. 260—165)

This application is a continuation of my application Ser. No. 144,572, filed Oct. 12, 1961, and now abandoned, which in turn is a continuation of my application Ser. No. 754,525, filed Aug. 12, 1958, and now abandoned.

The present invention relates to new basic dyestuffs; more particularly it relates to basic dyestuffs of the formula $$\left[ \begin{array}{c} \text{indoline structure with } R_1 \\ \text{C}-\text{CH}=\text{N}-\text{N} \end{array} \right]^+ \text{A} \quad X^- \quad \text{(I)}$$

In this formula $R_1$ stands for lower alkyl, $R_2$ means lower alkyl, A stands for one of the radicals

—C₆H₄—OCH₃, —C₆H₃(OCH₃)—, —C₆H₃(OCH₃)—OCH₃,

—C₆H₂(OCH₃)₂(OCH₃), —C₆H₄—NHOCCH₃, —C₆H₄—N=N—C₆H₅, naphthyl, or benzothiazolyl-CH₃ and X means an acid radical used for salt formation in basic dyestuffs.

The new dyestuffs (I) are preferably produced by reacting the basic starting dyestuffs of the formula $$\left[ \begin{array}{c} \text{indoline with } R_1 \\ \text{C}=\text{CH}-\text{N}=\text{N} \end{array} \right] \text{A}$$

wherein A and $R_1$ have the above mentioned significance, in the presence or absence of a solvent or diluent, with a suitable quaternizing alkylation agent and at elevated temperature, if desired, under pressure. After completion of the reaction the quaternary products precipitate in most cases in a crystalline form.

The dyestuff bases used for quaternizing and corresponding to the formula $$\left[ \begin{array}{c} R_1 \\ \text{C}-R_1 \\ \text{C}=\text{CH}-\text{N}=\text{N} \end{array} \right] \text{A}$$

wherein A and $R_1$ have the above mentioned significance, are easily obtainable by treating with alkalies the corresponding basic dyestuffs isolated as salts and corresponding to the formula $$\left[ \begin{array}{c} R_1 \\ \text{C}-R_1 \\ \text{C}-\text{CH}=\text{N}-\overset{H}{\text{N}} \end{array} \right]^+ \text{A} \quad X^-$$

wherein A, $R_1$ and X have the above mentioned significance.

The basic starting dyestuffs are obtainable from the 1,3,3-tri-lower alkyl-2-methylene-indoline compounds and the appropriate amine components in known manner.

The lower alkyl groups in the above identified compounds are preferably those containing 1 to 4 carbon atoms, such as $-CH_3$, $-C_2H_5$ and $-C_4H_9$.

The amino compounds to be used for the preparation of dyestuffs (I) are 1-amino-4-methoxybenzene, 1-amino-2-methoxybenzene, 1-amino-2,4- or -2,5-dimethoxybenzene, 1-amino-4-acetylaminobenzene, 1-amino-4-phenylazobenzene, 1- or 2-aminonaphthalene and dehydrothiotoluidine.

As quaternizing agents there may be used inter alia dimethyl sulfate and diethyl sulfate or methyl iodide and toluene sulfonic acid esters.

Suitable solvents or diluents are for example acetone, ligroin, benzine, benzene, toluene and xylene.

The invention further relates to new basic dyestuffs of the formula $$\left[ \begin{array}{c} R_1 \\ R_3-\text{C}-R_1 \\ \text{C}-\text{CH}=\text{N}-\text{N} \end{array} \right]^+ \text{A}_1 \quad X^- \quad \text{(II)}$$

In this formula $R_1$ stands for lower alkyl, $R_2$ means lower alkyl, $R_3$ stands for carbo lower alkoxy, lower alkoxy, chloro, cyano or nitro, $A_1$ stands for one of the radicals

—C₆H₄—CH₃, —C₆H₄—OCH₃, —C₆H₃—OCH₃,

—C₆H₃(OCH₃)—OCH₃, —C₆H₂(OCH₃)₂(OCH₃), —C₆H₄—NHOCCH₃,

—C₆H₄—N=N—C₆H₅, naphthyl, or benzothiazolyl-CH₃ and X means an acid radical used for salt formation in basic dyestuffs.

The new dyestuffs (II) are preferably produced by reacting the basic starting dyestuffs of the formula $$\left[ \begin{array}{c} R_1 \\ R_3-\text{C}-R_1 \\ \text{C}=\text{CH}-\text{N}=\text{N} \end{array} \right] \text{A}_1$$

wherein $A_1$, $R_1$ and $R_3$ have the above mentioned significance, in the presence or absence of a solvent or diluent, with a suitable quaternizing agent and at elevated temperature, if desired, under pressure. After completion of the reaction the quaternary products precipitate in most cases in a crystalline form.

The dyestuff bases used for quaternizing and corresponding to the formula

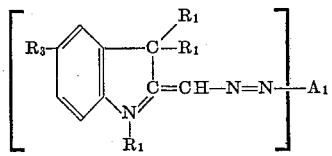

wherein $A_1$, $R_1$ and $R_3$ have the above mentioned significance, are easily obtainable by treating with alkalies the corresponding basic dyestuffs isolated as salts and corresponding to the formula

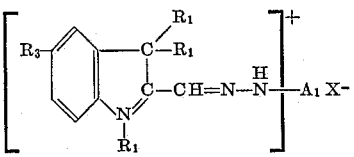

wherein $A_1$, $R_1$, $R_3$ and X have the above mentioned significance.

As heterocyclic compounds which are to introduce into the dyestuffs (II) the part

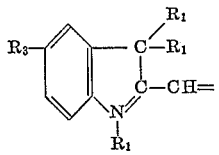

there are to be mentioned 1,3,3-trimethyl-5-chloro-2-methylene-indolines, 1,3,3-trimethyl-5-nitro-2-methylene-indoline, 1,3,3-trimethyl-5-alkoxy-2-methylene-indolines, 1-ethyl-3,3-dimethyl-5-ethoxy-2-methylene - indoline, 1-ethyl- or -methyl-3,3-dimethyl - 2 - methylene-indoline-5-carboxylic acid ethyl ester, 1,3,3-trimethyl-5-cyano-2-methylene-indoline.

The amino compounds to be used for the preparation of dyestuffs (II) are 1-amino-4-methoxybenzene, 1-amino-2-methoxy-benzene, 1-amino-2,4- or -2,5-dimethoxybenzene, 1-amino-4-acetylaminobenzene, 1-amino-4-phenylazobenzene, 1- or 2-amino-naphthalene, dehydrothiotoluidine and 1-amino-4-methylbenzene.

As quaternizing agents there may be used inter alia dimethyl sulfate, diethyl sulfate, methyl iodide, and toluene-sulfonic acid esters.

Suitable solvents or diluents are for example acetone, ligroin, benzine, benzene, toluene and xylene.

The new dyestuffs (I) and (II) are suitable for the dyeing of textiles, paper, coir, leather and other materials. The compounds are free from sulfonic acid and carboxylic acid groups and therefore especially suitable for the dyeing of articles from polyacrylonitrile, clear shades of very good fastness properties, especially excellent fastness to light being thus obtained.

In the following examples the parts by weight and the parts by volume being in the ratio of grams to millilitres.

*Example 1*

The hydrazo dyestuff from diazotized 1-amino-4-methoxy-benzene and 1,3,3-trimethyl-2-methylene-indoline is converted into the azo form by treating it with a sodium carbonate solution in an aqueous suspension. After recrystallization from methanol the compound melts at 152–154° C. 30.7 parts by weight of this compound are dissolved with heating in 100 parts by volume of toluene and treated dropwise with 12.6 parts by weight of dimethyl sulfate. The reaction mixture is then heated on a boiling water bath, the quaternary dyestuff separating out as yellow crystals already after a short time. The mixture is heated on the boiling water bath for another 3 hours, cooled and the dyestuff is filtered off with suction. The methyl sulfate of the dyestuff is thus obtained in the pure state; a further purification is unnecessary.

The dyestuff draws on polyacrylonitrile fibres in a clear yellowish orange shade and is especially distinguished by an outstanding fastness to light. Acetate rayon is also dyed in a clear yellowish orange shade.

When using the starting components listed in the following table for the manufacture of the basic hydrazo and azo dyestuffs and alkylating the azo dyestuffs with dimethyl sulfate according to the method described above, quaternary dyestuffs are obtained which dye fibres from polyacrylonitrile and acetate rayon in the indicated shades.

| Diazo component | Coupling component | Shade |
| --- | --- | --- |
| 1-aminonaphthalene | 1,3,3-trimethyl-methylene indoline. | Yellowish orange. |
| 4-aminoazobenzene | do | Do. |
| 1-amino-2-methoxybenzene | do | Greenish yellow. |
| 1-amino-2,4-dimethoxy-benzene. | do | Yellowish orange. |
| 1-amino-2,5-dimethoxy-benzene. | do | Orange. |
| 1-amino-4-acetylamino-benzene. | 1,3,3-trimethyl-2-methylene-indoline. | Do. |
| Dehydrothiotoluidine | do | Do. |
| 2-aminonaphthalene | do | Yellowish orange. |
| 1-amino-4-methoxybenzene | 1,3,3-trimethyl-5-methoxy-2-methylene-iodoline. | Do. |
| 1-amino-2,4-dimethoxy-benzene. | 1,3,3-trimethyl-5-chloro-2-methylene-indoline. | Do. |
| 1-amino-4-methoxybenzene | do | Orange. |
| 1-amino-4-methylbenzene | 1,3,3-trimethyl-5-carbo-methoxy-2-methylene-indoline. | Yellowish orange. |
| 1-amino-4-methoxybenzene | do | Orange. |
| Aminoazotoluene | do | Do. |
| 1-amino-4-methylbenzene | 1,3,3-trimethyl-5-nitro-2-methylene-indoline. | Yellowish orange. |

*Example 2*

The hydroazo dyestuff from diazotized 1-amino-4-methoxybenzene and 1,3,3-trimethyl-2-methylene-indoline is converted into the azo form by the method described in Example 1 (M.P. 152–154° C.). 15.4 parts by weight of this compound are dissolved in 50 parts by volume of toluene and treated with 9.3 parts by weight of 4-toluene sulfonic acid methyl ester. The reaction mixture is then heated on a boiling water bath, a yellowish orange crystalline precipitate being formed after some time. The mixture is heated for a total of 5 hours, then cooled and the dyestuff in the form of the 4-toluene sulfonate is filtered off with suction.

In a similar manner to that there is obtained by reacting with methyl iodide the iodide of the quaternary dyestuff which can be recrystallized from alcohol.

The dyestuffs dye fibres from polyacrylonitrile and acetate rayon in yellowish orange shades.

*Example 3*

15.4 parts by weight of the starting dyestuff used in Example 2 are dissolved with heating in 40 parts by volume of toluene and treated dropwise with 7.7 parts by weight of diethyl sulfate. The mixture is then heated on a boiling water bath for 5 hours, whereby an oil separates. Upon cooling, the oily dyestuff solidifies to form yellowish orange crystals which are isolated in usual manner. The dyestuff dyes acetate rayon and polyacronitrile fibres in a yellowish orange shade.

When using instead of diethyl sulfate the equimolecular amount of 4-toluene sulfonic acid ethyl ester, heating to 120° C. for 6 hours and working up in an analogous manner, a dyestuff of similarly good fastness properties is obtained. When using instead of 4-toluene sulfonic acid ethyl ester an excess of ethyl iodide and proceeding according to the same method a dyestuff is obtained which dyes polyacrylonitrile fibres also in a yellowish orange shade of outstanding fastness.

*Example 4*

The hydrazo dyestuff from diazotized 1-amino-4-methoxy-benzene and 1,3,3-trimethyl-2-methylene-indoline is converted into the corresponding azo compound according to the method described in Example 1. 15.4 parts by weight of this compound are dissolved with heating in 50 parts by volume of toluene and treated with 8.3 parts by weight of butyl bromide. The mixture is then slowly heated to the boil and stirred under reflux on an oil bath at a bath temperature of 120–124° C. for 24 hours. After cooling the separated dyestuff is filtered off with suction. By dissolving in boiling water and salting out with common salt, the product is separated from the unreacted starting material. The dyestuff dyes fibres from polyacrylonitrile in a yellowish orange shade of outstanding fastness properties.

*Example 5*

61.2 parts by weight of the starting dyestuff used in Example 4 are dissolved at 70° C. in 100 parts by volume of chlorobenzene and 27.7 parts by weight of dimethyl sulfate are added dropwise within 5 minutes. The mixture is then heated on a boiling water bath for 3 hours and the chlorobenzene is then blown off with steam. After the addition of some active carbon, steam is again introduced for a short period, the product is filtered hot and salted out with 100 parts by weight of common salt after the addition of 2 parts by volume of concentrated hydrochloric acid. The product is stirred overnight, filtered off with suction and washed with 100 parts by volume of a 10 percent common salt solution. The dyestuff thus obtained is identical with the dyestuff described in Example 1.

Polyacronitrile fibres are introduced at 40° C. into an aqueous bath containing per litre 0.75 gram of glacial acetic acid, 0.4 gram of sodium acetate and 0.2 gram of the dyestuff obtained according to Example 1 (first dyestuff) using a liquor-to-goods ratio of 40:1. The bath is heated to the boil within 20 to 30 minutes and kept at this temperature for 30 to 60 minutes. The polyacrylonitrile fibres are then rinsed and dried. A yellowish orange dyeing is thus obtained of excellent fastness to wetting and light.

*Example 6*

A copying black is obtainable by mixing the following basic dyestuffs 50 parts by weight of malachite green
15 parts by weight of methyl violet
15 parts by weight of fuchsine and
20 parts by weight of the first dyestuff obtained according to Example 1.

This black is worked with mineral oil, carnauba wax and wool fat into a copying ink enabling a level copying to be carried out by known working methods.

What is claimed is:

1. A basic dyestuff of the formula

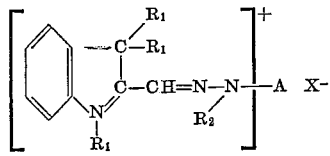

wherein $R_1$ stands for lower alkyl, $R_2$ stands for lower alkyl, A stands for one of the radicals

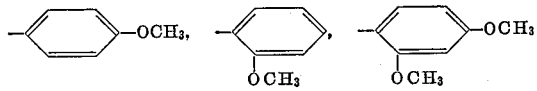

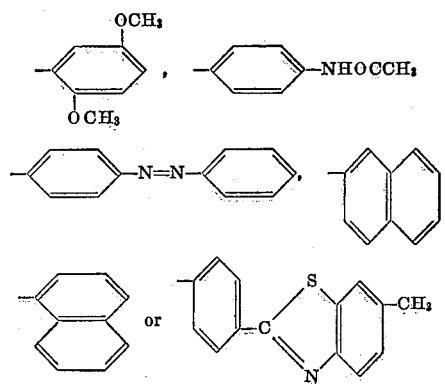

and X stands for an acid radical used for salt formation in basic dyestuffs.

2. A basic dyestuff of the formula

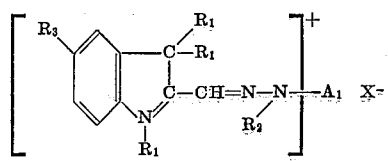

wherein $R_1$ stands for lower alkyl, $R_2$ stands for lower alkyl, $R_3$ stands for carbo lower alkoxy, lower alkoxy, chloro, cyano or nitro, $A_1$ stands for one of the radicals

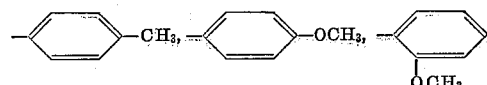

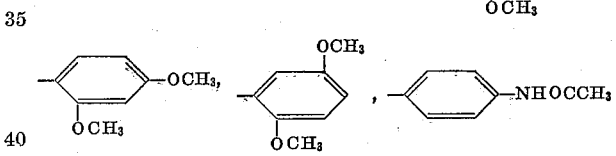

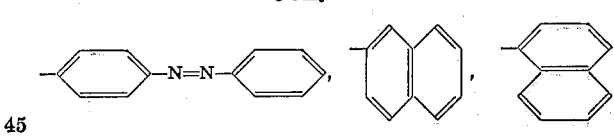

or

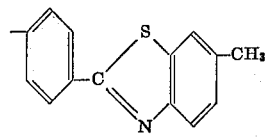

and X stands for an acid radical used for salt formation in basic dyestuffs.

3. The basic dyestuff of claim 2 wherein $R_3$ stands for —$NO_2$.

4. The basic dyestuff of the formula

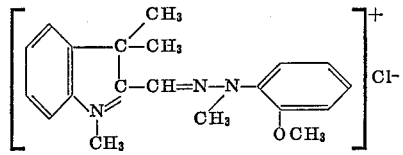

5. The basic dyestuff of the formula

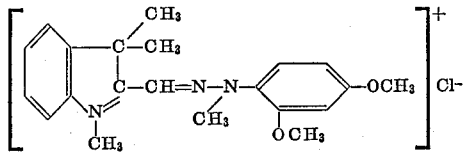

6. The basic dyestuff of the formula

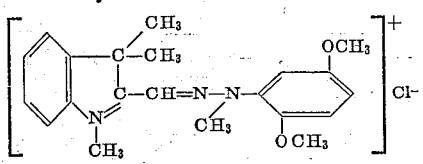

7. The basic dyestuff of the formula

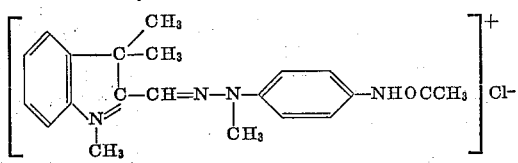

8. The basic dyestuff of the formula

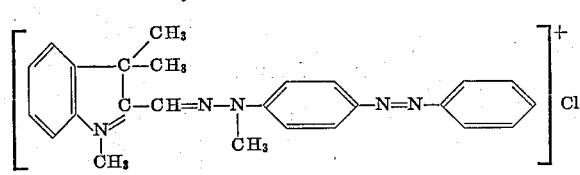

9. The basic dyestuff of the formula

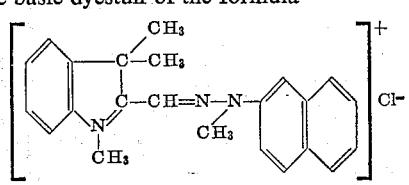

10. The basic dyestuff of the formula

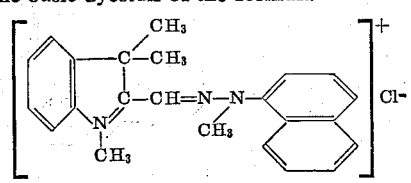

11. The basic dyestuff of the formula

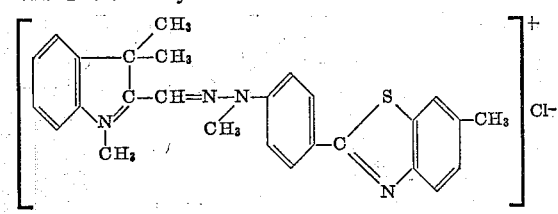

12. The basic dyestuff of the formula

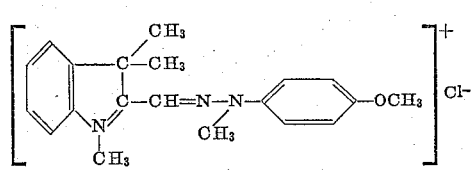

13. The basic dyestuff of the formula

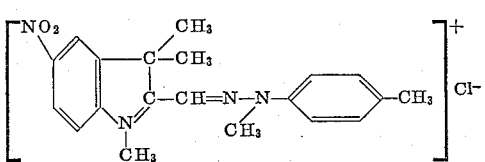

14. The basic dyestuff of the formula

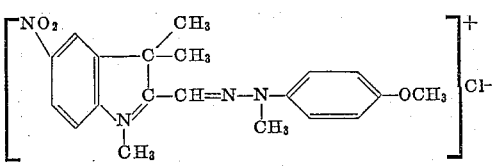

15. The basic dyestuff of the formula

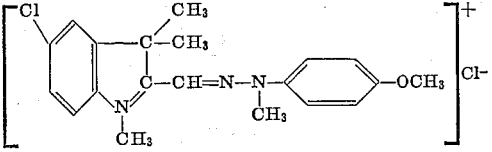

References Cited

UNITED STATES PATENTS 2,815,338   12/1957   Ruegg _____ 260—152

OTHER REFERENCES

Rosenhauer et al., Ber. Deut. Chem., vol. 59, pp. 2413–2416 (1926).

CHARLES B. PARKER, *Primary Examiner.*
FLOYD D. HIGEL, *Assistant Examiner.*